US011568129B2

(12) United States Patent
Miller, III

(10) Patent No.: US 11,568,129 B2
(45) Date of Patent: Jan. 31, 2023

(54) SPREADSHEET RECALCULATION ALGORITHM FOR DIRECTED ACYCLIC GRAPH PROCESSING

(71) Applicant: North Carolina State University, Raleigh, NC (US)

(72) Inventor: Thomas K. Miller, III, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/486,622

(22) PCT Filed: Feb. 15, 2018

(86) PCT No.: PCT/US2018/018358
§ 371 (c)(1),
(2) Date: Aug. 16, 2019

(87) PCT Pub. No.: WO2018/152319
PCT Pub. Date: Aug. 23, 2018

(65) Prior Publication Data
US 2019/0370322 A1    Dec. 5, 2019

Related U.S. Application Data

(60) Provisional application No. 62/460,009, filed on Feb. 16, 2017.

(51) Int. Cl.
*G06F 16/22* (2019.01)
*G06F 40/18* (2020.01)
(Continued)

(52) U.S. Cl.
CPC ............ *G06F 40/18* (2020.01); *G06F 16/322* (2019.01); *G06F 40/14* (2020.01)

(58) Field of Classification Search
None
See application file for complete search history.

(56) References Cited

U.S. PATENT DOCUMENTS 5,873,081 A * 2/1999 Harel .................... G06F 16/335
6,216,138 B1   4/2001 Wells et al.
(Continued)

OTHER PUBLICATIONS

International Search Report and Written Opinion, PCT/US2018/018358, dated Apr. 26, 2018.
(Continued)

*Primary Examiner* — Maikhanh Nguyen
(74) *Attorney, Agent, or Firm* — Michael Best & Friedrich LLP

(57) ABSTRACT

The present disclosure includes a computing device, a system, and method for performing a spreadsheet recalculation algorithm. In one embodiment, the computing device includes an electronic processor, and a memory coupled to the electronic processor. The memory includes Directed Acyclic Graph (DAG) data having a plurality of nodes, each node of the plurality of nodes having at least one of a constant value or one or more inputs, and program instructions. The program instructions, when executed by the electronic processor, cause the electronic processor to change the plurality of nodes, and update one or more affected nodes of the plurality of nodes based on the change to the plurality of nodes, the one or more affected nodes being less than all of the plurality of nodes.

18 Claims, 11 Drawing Sheets

(51) Int. Cl.
*G06F 16/31* (2019.01)
*G06F 40/14* (2020.01)

(56) References Cited

U.S. PATENT DOCUMENTS

| | | | |
|---|---|---|---|
| 6,343,376 B1 | 1/2002 | Saxe et al. | |
| 7,444,330 B2* | 10/2008 | Bernstein | G06F 16/86 |
| 8,466,919 B1* | 6/2013 | Duff | G06T 17/005 |
| | | | 717/124 |
| 9,104,708 B2* | 8/2015 | Morsi | G06F 16/219 |
| 9,575,950 B2* | 2/2017 | Matheson | G06F 40/18 |
| 2003/0144868 A1* | 7/2003 | MacIntyre | G06Q 10/0637 |
| | | | 705/7.38 |
| 2004/0088158 A1* | 5/2004 | Sheu | G06F 16/24522 |
| | | | 704/9 |
| 2004/0158799 A1* | 8/2004 | Breuel | G06F 16/84 |
| | | | 715/212 |
| 2005/0060332 A1* | 3/2005 | Bernstein | G06F 16/86 |
| 2006/0059027 A1* | 3/2006 | Berenbach | G06F 30/00 |
| | | | 717/104 |
| 2008/0208910 A1* | 8/2008 | MacIntyre | G06Q 10/0637 |
| 2009/0157723 A1* | 6/2009 | De Peuter | G06Q 10/10 |
| 2010/0169137 A1* | 7/2010 | Jastrebski | G06T 11/206 |
| | | | 715/215 |
| 2011/0148880 A1* | 6/2011 | De Peuter | H04L 41/12 |
| | | | 345/440 |
| 2014/0071135 A1 | 3/2014 | Morsi et al. | |
| 2014/0074770 A1* | 3/2014 | Morsi | G06F 16/9024 |
| | | | 707/600 |
| 2014/0082470 A1* | 3/2014 | Trebas | G06F 40/131 |
| | | | 715/217 |
| 2014/0164412 A1* | 6/2014 | Rosenberg | G06F 16/211 |
| | | | 707/756 |
| 2014/0164895 A1* | 6/2014 | Matheson | G06F 40/18 |
| | | | 715/212 |
| 2017/0147709 A1* | 5/2017 | Ganz | G06F 16/9027 |

OTHER PUBLICATIONS

International Search Report and Written Opinion for related Application No. PCT/US18/18358 dated Apr. 26, 2018 (6 pages).

* cited by examiner

```
global Spreadsheet S;
global TopologicalSort TS;

RecalculateTE () {
    for each FormulaCell F in S {
        F.visited = false;
        F.updated = false;
    }
    TS = null;
    for each FormulaCell F in S {
        Visit(F);
    }
}

RecalculateNTE () {
    for each FormulaCell F in TS {
        F.updated = false;
        NeedsEval = false;
        for each DirectPredecessor DP of F {
            if (DP.updated) {
                NeedsEval = true;
            }
        }
        if (NeedsEval) {
            OldValue = F.value;
            Evaluate(F);
            If (F.value != OldValue) {
                F.updated = true;
            }
        }
    }
}

Visit(FormulaCell F) {
    If (F.visited == false) {
        F.visited = true;
        NeedsEval = false;
        for each DirectPredecessor DP of F {
            Visit(DP);
            if (DP.updated) {
                NeedsEval = true;
            }
        }
        append F to TS;
        if (NeedsEval) {
            OldValue = F.value;
            Evaluate(F);
            if (F.value != OldValue) {
                F.updated = true;
            }
        }
    }
}
```

FIG. 4

```
global EditSerialNumber ESN;
global RegionOfInterest ROI;
global PartialTopologicalSort PTS;

RecalculateTE() {
    increment ESN;
    PTS = null;
    for each FormulaCell F in ROI {
        Observe(F);
    }
}

RecalculateNTE() {
    for each FormulaCell F in PTS {
        F.osn = ESN;
        NeedsEval = false;
        for each DirectPredecessor DP of F {
            if (DP.usn > F.usn) {
                NeedsEval = true;
            }
        }
        if (NeedsEval) {
            OldValue = F.value;
            Evaluate(F);
            if (F.value != OldValue) {
                F.usn = ESN;
            }
        }
    }
}

Observe(FormulaCell F) {
    If (F.osn < ESN) {
        F.osn = ESN;
        NeedsEval = false;
        for each DirectPredecessor DP of F {
            Observe(DP);
            if (DP.usn > F.usn) {
                NeedsEval = true;
            }
        }
        append F to PTS;
        if (NeedsEval) {
            OldValue = F.value;
            Evaluate(F);
            if (F.value != OldValue) {
                F.usn = ESN;
            }
        }
    }
}
```

FIG. 7

| Edit # | Action | Cell Formula Evaluations, Worksheet 800 | Cell Formula Evaluations, Worksheet 900 | Total |
|---|---|---|---|---|
| 1 | Enter loan amount in cell B3 | 1 | - | 1 |
| 2 | Enter interest rate in cell B4 | 1 | - | 1 |
| 3 | Enter loan term in cell B5 | 1 | - | 1 |
| 4 | Change the interest rate in cell B4 | 1 | - | 1 |
| 5 | Change the term in cell B5 | 1 | - | 1 |
| 6 | View the amortization table on Sheet 2 | - | 1,440 | 1,440 |
| | Total cell formula evaluations | 5 | 1,440 | 1,445 |

FIG. 10

| Edit # | Action | Cell Formula Evaluations, Worksheet 800 | Cell Formula Evaluations, Worksheet 900 | Total |
|---|---|---|---|---|
| 1 | Enter loan amount in cell B3 | 1 | 1,440 | 1,441 |
| 2 | Enter interest rate in cell B4 | 1 | 1,440 | 1,441 |
| 3 | Enter loan term in cell B5 | 1 | 1,440 | 1,441 |
| 4 | Change the interest rate in cell B4 | 1 | 1,440 | 1,441 |
| 5 | Change the term in cell B5 | 1 | 1,440 | 1,441 |
| 6 | View the amortization table on Sheet 2 | - | - | - |
| | Total cell formula evaluations | 5 | 7,200 | 7,205 |

FIG. 11

SPREADSHEET RECALCULATION ALGORITHM FOR DIRECTED ACYCLIC GRAPH PROCESSING

This patent application is the U.S. national stage entry, under 35 U.S.C. § 371, of International Application Number PCT/US2018/018358, filed Feb. 15, 2018 which claims priority to U.S. Provisional Application No. 62/460,009, filed Feb. 16, 2017, the entire contents of each of which are hereby incorporated by reference.

BACKGROUND

The present disclosure relates to direct acyclic graph processing, and more specifically, the present disclosure relates to a topographical sort for directed acyclic graph (DAG) processing.

Spreadsheets, for example, are widely used by non-programmers to perform computational tasks that would ordinarily require the knowledge and skills of a programmer. This is largely a result of the fact that spreadsheet software automatically determines the computational steps to determine a result from data dependencies, rather than requiring a human programmer to specify those steps. This is easily accomplished due to the fact that the contents of the spreadsheet can be represented as a directed acyclic graph (DAG) and the proper order of evaluation can be determined by performing a topological sort on the DAG.

Spreadsheet software employs a conventional topological sort method to determine the order of evaluation of cell formulas. While the conventional topographical sort method is guaranteed to produce correct results, the conventional topographical sort method is also inefficient in many practical use cases. The inefficiency of the conventional topographical sort method stems from the superfluous evaluation of cell formulas. The inefficiency also increases substantially in large spreadsheets (i.e., a large number of cells across a large number of sheets) with complex formulas.

SUMMARY

The present disclosure significantly reduces superfluous node evaluations, also referred to herein as "superfluous cell formula evaluations" or "superfluous calculations." The significant reduction in superfluous node evaluations results in an increase in efficiency in recalculations, and ultimately, in an increase in efficiency of the computing device. Further, the present disclosure is applicable to programming systems whose computational flow can be represented as a DAG. This paradigm is known in computer science as functional programming.

To significantly reduce superfluous node evaluations, the present disclosure includes the concept of an Edit Serial Number (ESN) (also referred to as a global counter) that tracks the temporal evolution of the spreadsheet as a user edits the cells. The ESN allows the formula in each cell of the spreadsheet, for example, to be evaluated only if and only when the value of the cell is needed (also referred to herein as "Just-In-Time evaluation" or "Just-In-Time recalculation"). Cells in a spreadsheet are analogous to nodes in a DAG. Whether a cell value or node value is needed depends on the DAG system in question, and in one example, the need is based on when a node is to be observed by the direction of programming in the computing device or at the direction of a user of the computing device. Just-In-Time recalculation not only reduces superfluous node (e.g., cell formula) evaluations, Just-In-Time also distributes the recalculation over time as the user scrolls and tabs around the workbook, or observes different regions of the DAG. The distribution of the recalculation over time further reduces the magnitude of computational spikes of the computing device and improves the overall user experience of the computing device.

While the present disclosure is described with respect to spreadsheets, the present disclosure is applicable to other DAG applications, including but not limited to telephone switching, airline scheduling, source code management, kinship computation and system modeling. Other exemplary programming systems, such as Mathematica or other such functional simulation systems may be used with the present disclosure.

In one embodiment, the present disclosure includes a computing device. The computing device includes an electronic processor, and a memory coupled to the electronic processor. The memory includes Directed Acyclic Graph (DAG) data having a plurality of nodes, each node of the plurality of nodes having at least one of a constant value or one or more inputs, and program instructions. The program instructions, when executed by the electronic processor, cause the electronic processor to change the plurality of nodes, and update one or more affected nodes of the plurality of nodes based on the change to the plurality of nodes, the one or more affected nodes being less than all of the plurality of nodes.

In another embodiment, the present disclosure includes a system. The system includes a display device and a server communicatively connected to the display device. The server includes an electronic processor; and a memory coupled to the electronic processor. The memory includes Directed Acyclic Graph (DAG) data having a plurality of nodes, each node of the plurality of nodes having at least one of a constant value or one or more inputs, and program instructions. The program instructions, when executed by the electronic processor, cause the electronic processor to control the display device to display values of some or all of the plurality of nodes, change the plurality of nodes, update one or more affected nodes of the plurality of nodes based on the change to the plurality of nodes, the one or more affected nodes being less than all of the plurality of nodes, and control the display device to display the update to values of the one or more affected nodes.

In yet another embodiment, the present disclosure includes a method for performing a spreadsheet recalculation algorithm. The method includes displaying, with a display device, values of some or all of a plurality of nodes included in Directed Acyclic Graph (DAG) data that is stored in a memory. The method includes changing, with an electronic processor, the plurality of nodes, each node of the plurality of nodes having at least one of a constant value or one or more inputs. The method includes updating, with the electronic processor, one or more affected nodes of the plurality of nodes based on the change to the plurality of nodes, the one or more affected nodes being less than all of the plurality of nodes. The method also includes controlling, with the electronic processor, the display device to display the update to values of the one or more affected nodes.

Other aspects of the present disclosure will become apparent by consideration of the detailed description and accompanying drawings.

BRIEF DESCRIPTION OF THE DRAWINGS

FIG. 4 is a diagram that illustrates an exemplary pseudocode of a spreadsheet recalculation algorithm.

FIG. 7 is a diagram that illustrates an exemplary pseudocode for a just-in-time recalculation algorithm extended to support a partial topological sort of a region of interest.

FIG. 10 is a table that illustrates an example of total cell formula calculations with the just-in-time recalculation algorithm of FIG. 6.

FIG. 11 is a table that illustrates a comparative example of total cell formula calculations with conventional automatic recalculation.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not described herein. Furthermore, some embodiments described herein may include one or more electronic processors configured to perform the described functionality by executing instructions stored in a non-transitory computer-readable medium. Similarly, embodiments described herein may be implemented as non-transitory, computer-readable medium storing instructions executable by one or more electronic processors to perform the described functionality. Described functionality can be performed in a client-server environment, a cloud computing environment, a local-processing environment, or a combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Further, terms such as "first", "second", and "third" are used herein for purposes of description and are not intended to indicate or imply relative importance or significance.

Figure 1:
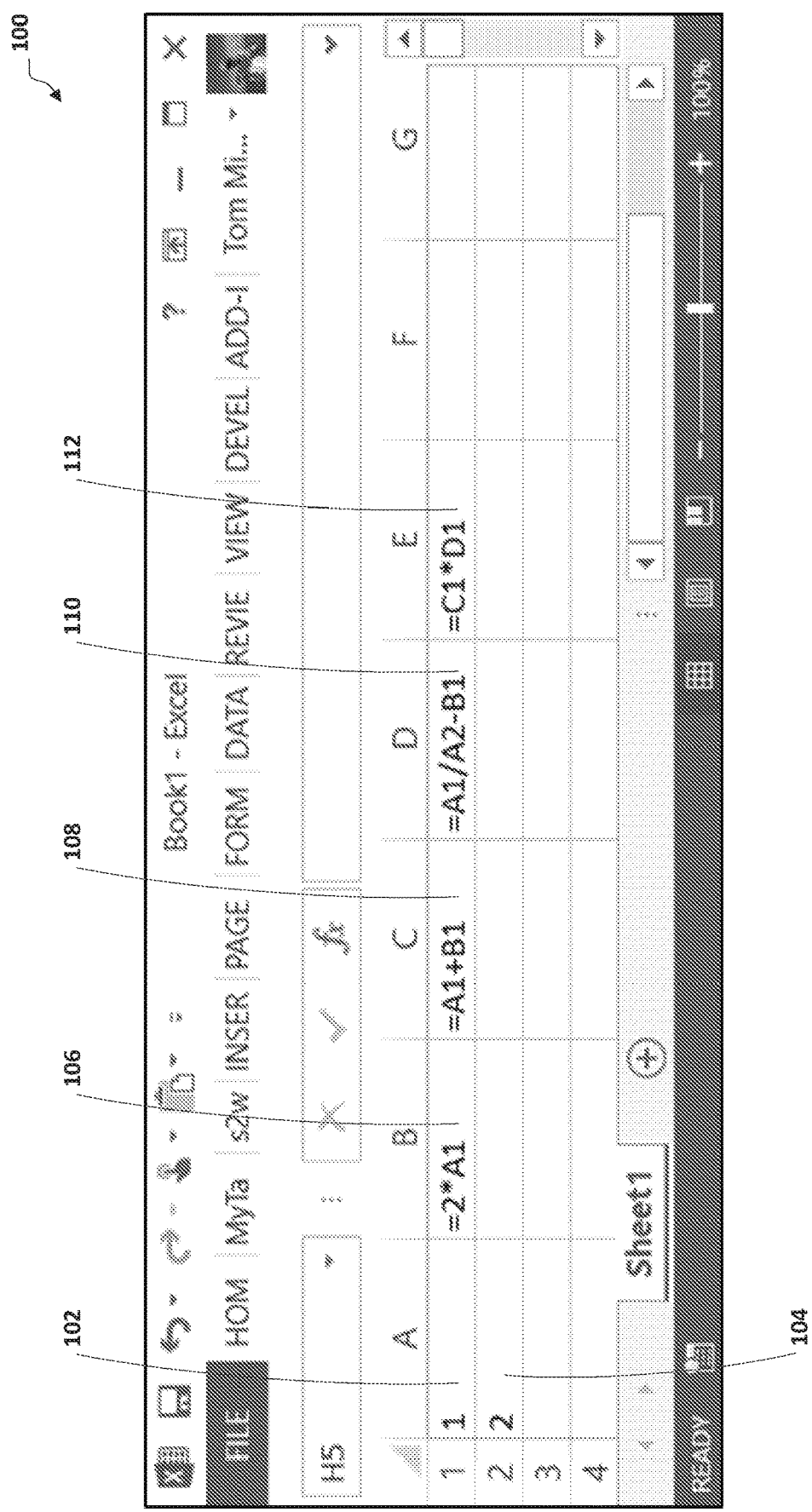
FIG. 1 is a diagram that illustrates a spreadsheet with two constant cells and four formula cells.

FIG. 1 is a diagram that illustrates a spreadsheet 100 with two constant cells 102 and 104 and four formula cells 106-112. In the illustrative example of FIG. 1, the spreadsheet 100 contains a total of six cells: two constant cells 102 and 104 (cells A1 and A2, respectively) and four formula cells 106-112 (cells B1, C1, D1 and E1, respectively).

Figure 2:
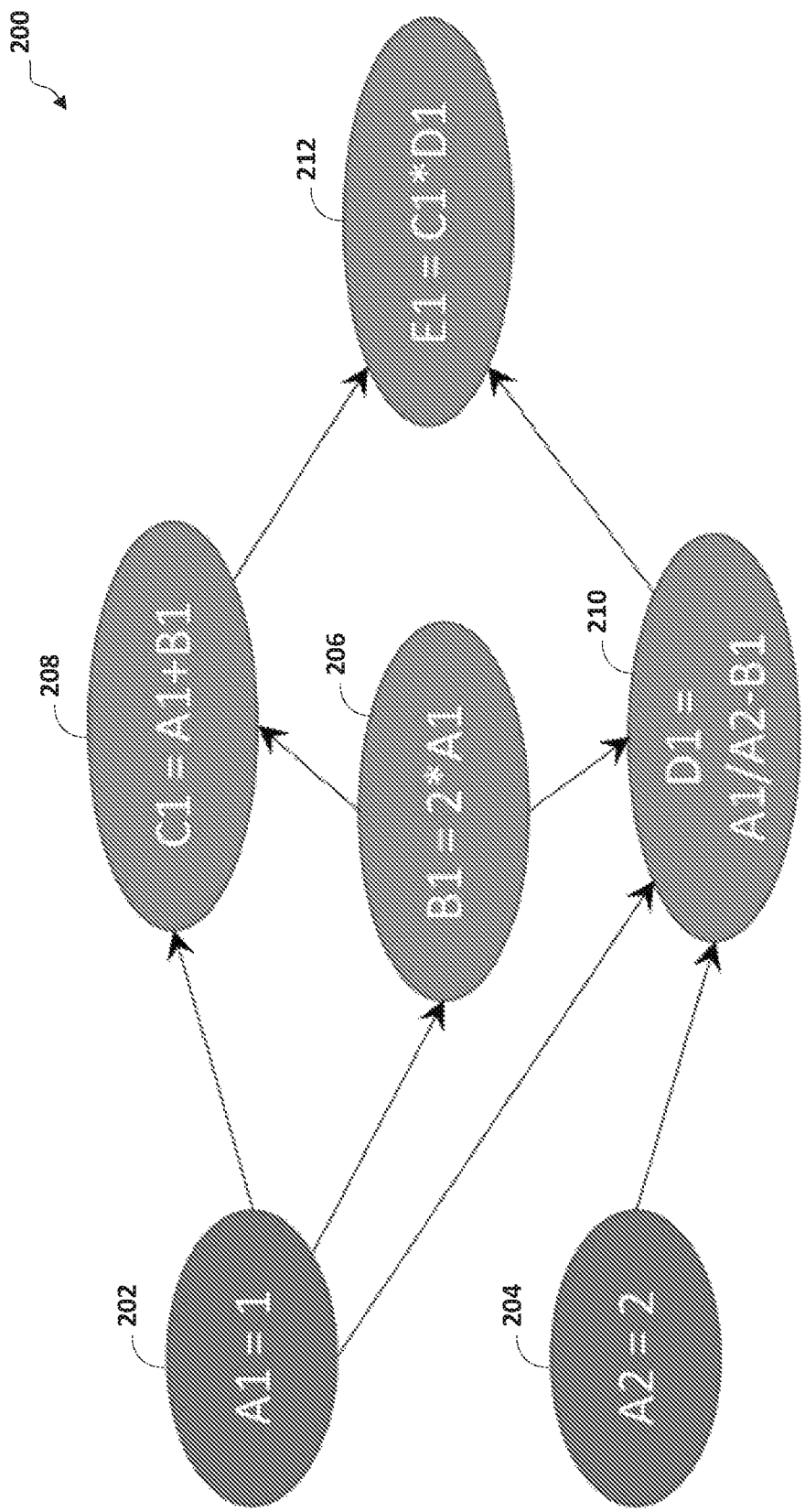
FIG. 2 is a flow diagram that illustrates a directed acyclic graph representing the spreadsheet of FIG. 1.

FIG. 2 is a flow diagram that illustrates a directed acyclic graph (DAG) 200 representing the spreadsheet 100 of FIG. 1. In the example of FIG. 2, the DAG 200 includes nodes 202, 204, 206, 208, 210, and 212 that correspond to cells 102, 104, 106, 108, 110, and 112, respectively, of the spreadsheet 100. A plurality of arrows or a plurality of edges between the nodes 202-212 represent the dependencies (for example, one or more arrows or one or more edges leading from one node to another node) defined by the node formulas. To determine the order of evaluation of the formula containing nodes, the spreadsheet software must compute a topological sort of the DAG 200.

In the example of FIG. 2, nodes 202-210 are a first node type and node 212 is a second node type. The first node type is an upstream node that has at least one dependent node downstream with the dependency represented by one or more edges leading from the upstream node to the at least one dependent node. Specifically, nodes 202 and 204 are the first node type and are only upstream nodes because nodes 202 and 204 contain a constant value. Similarly, nodes 206-210 are also the first node type and are both upstream nodes and downstream nodes because nodes 206-210 depend from at least node 202 and have at least one dependent node.

The second node type is only a downstream node represented by one or more edges leading from one or more upstream nodes into the downstream node. Node 212 is the second node type because node 212 depends from nodes 208 and 210 and does not have at least one dependent node.

Figure 3:
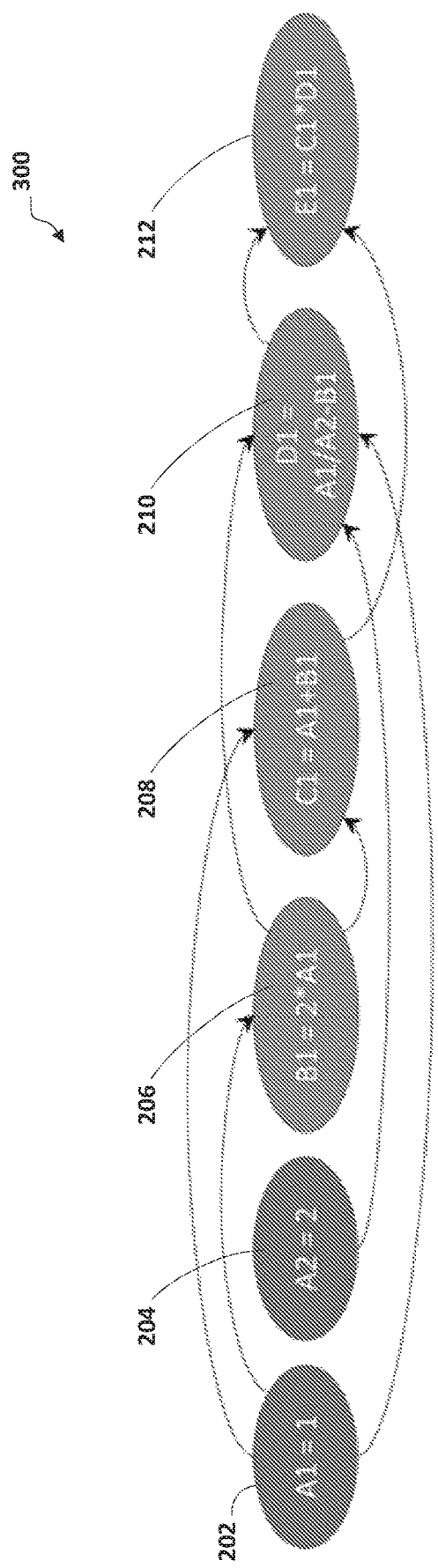
FIG. 3 is a flow diagram that illustrates a topological sort of the directed acyclic graph of FIG. 2.

FIG. 3 is a flow diagram that illustrates a topological sort 300 of the directed acyclic graph 200 of FIG. 2. In the example of FIG. 3, the topographical sort 300 is visually depicted as a linear array of the DAG nodes 202-212 in which all of the dependency arrows flow toward the right.

The topological sort 300 is a well-known algorithm in graph theory and is sufficient to determine the order of evaluation of spreadsheet cells. For purposes of recalculation, only the formula cells (or nodes) are relevant. Each time a formula cell is edited such that the DAG topology changes (i.e., a formula cell is inserted, deleted, or modified such that the in-degree or out-degree of the cell changes), the topographical sort 300 must be determined prior to recalculation. Constant cells (or nodes) have an in-degree of zero, thus are always to the left of all formula node in the TS. Edits to constant cells (including insertion and deletion) do not change the topological sort order of the formula cells; therefore, it is not necessary to perform the sort for any edit of a constant cell.

There are two general approaches to topological sorting, either a depth-first search (DFS) which is generally implemented as a recursive procedure, or a breadth-first search (BFS), generally implemented using a queue. The computational complexity is the same for both, $O(|N|+|E|)$, where N is the number of nodes and E is the number of edges. DFS is the basis of the algorithms presented herein, but the aspects described herein are equally applicable to BFS.

In a conventional spreadsheet recalculation, the spreadsheet will edit constant cells as "what if" scenarios and the output of all of the calculations resulting from those edits will be observed. A recalculation is performed simply by traversing the TS left to right. A formula cell needs to be recalculated only if any of its predecessors have been recalculated. For the example depicted in FIGS. 1-3, if the value of node 204 is changed from 2 to 3, the topographical sort 300 is traversed from left to right to determine which cells to evaluate. Node 206 does not depend from node 204, so node 206 is not recalculated. The same applies to node 208. Node 210 does depend on node 204, so node 210 is recalculated. Node 212 depends on node 210, so node 212 is also recalculated. If the value of node 202 is edited, it is easily seen that nodes 206-212 will be recalculated in order.

A minor inefficiency in the conventional spreadsheet recalculation is that when traversing the topographical sort 300, the spreadsheet software determines whether any upstream dependencies were marked for recalculation. If so, the dependent cell is recalculated by the spreadsheet software. This may result in unnecessary evaluation of cells downstream in the topographical sort 300.

To understand this unnecessary evaluation, assume that rather than containing a formula of A1/A2–B1, node 210 contains the formula MAX(A1/A2,0.5)–B1. When the constant value of the node 204 is set to 4. The spreadsheet software traverses the topographical sort 300, and nodes 206 and 208 are not recalculated because neither node 206 nor node 208 depends on node 204. Node 210 is recalculated because node 210 depends on node 204. However, the value of node 210 does not change as a result of the recalculation. Node 212 will be recalculated because node 210 is recalculated, but this is unnecessary because the value of node 210 did not change.

FIG. 4 is a diagram that illustrates an exemplary pseudocode of a spreadsheet recalculation algorithm 400. The spreadsheet recalculation algorithm 400 tests whether any upstream nodes have been updated (for example, updated or changed as a result of recalculation). When the spreadsheet recalculation algorithm 400 determines that none of the upstream nodes have been updated, then the spreadsheet recalculation algorithm 400 determines none of the nodes need to be recalculated (including the downstream nodes that depend from the upstream nodes). When the spreadsheet recalculation algorithm 400 determines that one or more upstream nodes have been updated, then the spreadsheet recalculation algorithm 400 determines whether the downstream nodes that depend from the one or more upstream nodes need to be updated based on the update to the one or more upstream nodes.

In the example of FIG. 4, a RecalculateTE(S) of the spreadsheet recalculation algorithm 400 is called after a change to the topology of the DAG data, also referred to as a topological edit (TE). The RecalculateTE(S) of the spreadsheet recalculation algorithm 400 performs a complete spreadsheet recalculation, and simultaneously constructs a topological sort. Similarly, in the example of FIG. 4, a RecalculateNTE(TS) is called after an edit to a node with only a constant value, also referred to as a non-topological edit (NTE). In some examples, the exemplary pseudocode of the spreadsheet recalculation algorithm 400 may also include code for detecting cycles.

Figure 5:
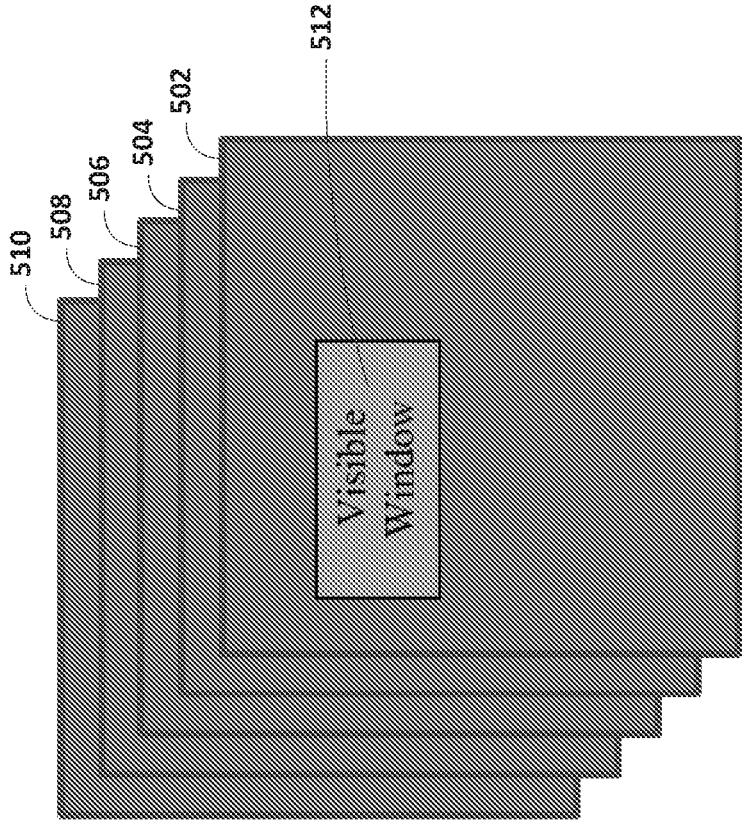
FIG. 5 is a diagram that represents a spreadsheet with multiple worksheets.

FIG. 5 is a diagram that represents a spreadsheet 500 with multiple worksheets 502-510. In the example of FIG. 5, the worksheet 502 is larger than a visible window 512 displayed on a display device.

In some examples, a user may perform multiple edits within the visible window before scrolling within the current worksheet 502, or tabbing to another worksheet of the worksheets 504-510. In conventional recalculation, each of the multiple edits by the user will trigger a recalculation which results in all cell formulas on all worksheets to be examined and recalculated when an upstream predecessor in the topographical sort has been recalculated. For instance, a mortgage calculator has input parameters (for example, loan amount, term, interest rate, or other suitable loan parameters) that are entered on a form in worksheet 502. After the input parameters of the mortgage calculator are entered, worksheet 504 determines the amortization table over the life of the loan. Each edit that is entered on worksheet 502 will trigger evaluation of all the cells (i.e., all of the nodes) on worksheet 504, even though the user may never look at the cells on worksheet 504 until all data entry on the worksheet 502 is completed. In this example, with three input parameters in the form in worksheet 502, the worksheet 504 will be recalculated three times and sixty seven percent of those calculations may be considered superfluous because the calculations may never be observed by the user. Additionally, when the user performs "what if" scenarios with the input parameters (for example, playing with the term and interest rate to observe the effect on monthly payment), the number of superfluous calculations significantly increases.

Conventionally, Excel and other spreadsheet products provide for manual recalculation that defers recalculation of the spreadsheet formulas until the user manually requests the recalculation. In the above example, the user may enter all three parameters and then manually request recalculation. However, many superfluous calculations will still occur on the worksheet 504 when the user performs "what if" analyses on the worksheet 502. Additionally, manual recalculation is almost never used and generally disregarded because of the degradation in user experience when the user is tasked with remembering when to request a manual recalculation. More importantly, superfluous calculations cannot be considered trivial because superfluous calculations are a significant factor in multi-tasking systems where CPU cycles are at a premium. For example, a server that provides a virtual environment may have hundreds of users and each of the hundreds of users may be using a spreadsheet product. The hundreds of spreadsheet products may collectively perform a significant number of superfluous calculations that are unnecessary and a waste of computing cycles. In one example, assuming roughly 5,000 superfluous calculations per edit per user as described in greater detail below, and assuming all of the users enter an edit at the same time, the collective number of superfluous calculations is 500,000 for 100 users.

Figure 6:
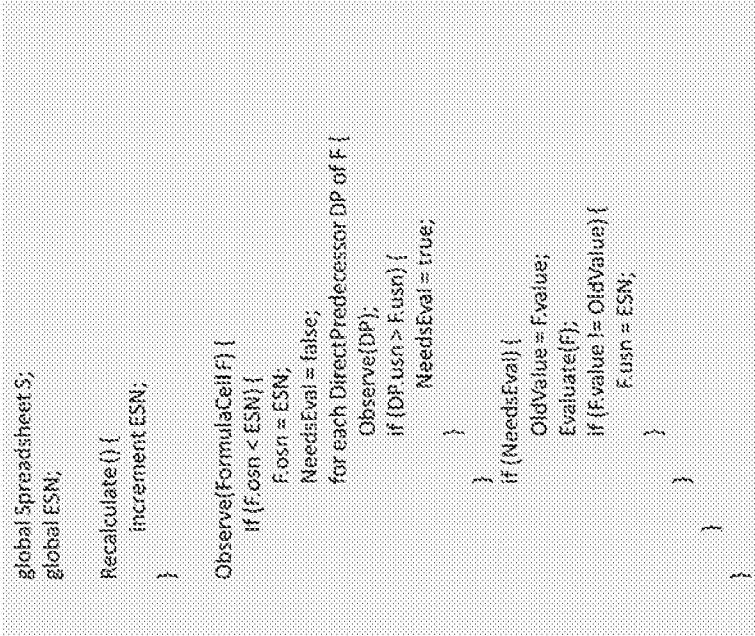
FIG. 6 is a diagram that illustrates an exemplary pseudocode for a just-in-time recalculation algorithm.

FIG. 6 is a diagram that illustrates an exemplary pseudocode for a just-in-time recalculation algorithm 600. The just-in-time recalculation algorithm 600, which is also a spreadsheet recalculation algorithm, significantly reduces the number of superfluous calculations performed by a spreadsheet product, and in some examples, may entirely eliminate superfluous calculations from being performed by the spreadsheet product.

In the example of FIG. 6, when a node is observed, the just-in-time recalculation algorithm 600 evaluates the node only when one of the upstream nodes has been updated since the value of the node was updated. To efficiently implement the just-in-time recalculation algorithm 600, a global Edit Serial Number (ESN) mechanism tracks the temporal state of the recalculation process over a series of edits and observations. The global Edit Serial Number (ESN) replaces the Boolean flags F.visited and F.updated with serial numbers F.osn and F.usn, respectively. The serial number F.osn tracks observations of each node and the serial number F.usn tracks updates of the value of each node. In some examples, F.osn is an observation timestamp. In some examples, F.usn is an update timestamp.

In the example of FIG. 6, the Recalculate(S) of the just-in-time recalculation algorithm 600 increments the ESN. The just-in-time recalculation algorithm 600 performs formula evaluations of each node only when a node is observed and the value of the node needs to be updated. With respect to FIG. 5, a user may observe the cells in the visible window 512 of FIG. 5 (or a plurality of visible windows) and each call to Recalculate(S) of the just-in-time recalculation algorithm 600 provides the equivalent user experience of conventional recalculation while significantly reducing superfluous calculations performed by the spreadsheet 500. Additionally, when the visible window 512 changes; e.g., by scrolling or tabbing to a different worksheet, all that is required is to observe the cells in a new visible window and each call to Recalculate(S) of the just-in-time recalculation algorithm 600 again provides the equivalent user experience of conventional recalculation while significantly reducing superfluous calculations performed by the spreadsheet 500.

The just-in-time recalculation algorithm 600 performs recalculation after both topological and non-topological edits. The just-in-time recalculation algorithm 600 is also significantly more efficient than conventional recalculation.

In some examples, performance gains may also be achieved by constructing a topological sort to be used following non-topological edits, for example, after the spreadsheet recalculation algorithm 400 of FIG. 4. The topographical sort for performing recalculation after a non-topological edit may be achieved with an extension to the just-in-time recalculation algorithm 600. In this case, however, the efficiency gains of the just-in-time recalculation algorithm 600 are preserved by determining a partial topological sort over the visible window 512, also referred to as a Region of Interest. The partial topological sort may be incrementally extended as additional nodes are added to the Region of Interest. Additionally, removing nodes from the Region of Interest requires the partial topological sort to be determined again. FIG. 7 is a diagram that illustrates an exemplary pseudocode for a just-in-time recalculation algorithm 700 extended to support a partial topological sort of a region of interest.

In the example of FIG. 7, the just-in-time recalculation algorithm 700 is performed over the Region of Interest, which may be any subset of the cells of the spreadsheet (i.e., any subset of nodes of the DAG data). The Region of Interest would be the list of formula cells within the visible window 512 (or a plurality of visible windows). The RecalculateTE( ) of the just-in-time algorithm 700 generates a partial topological sort covering the Region of Interest. If the Region of Interest is expanded, the partial topological sort may be extended simply by observing the cells added to the Region of Interest. When a new Region of Interest is defined, calling the RecalculateTE( ) of the just-in-time algorithm 700 generates a new topological sort. Additionally, after a non-topological edit, calling the RecalculateNTE( ) causes all cells in the Region of Interest to be recalculated.

When processing real spreadsheet algorithms, a few additional considerations may be taken account in practice: cycle detection, impure functions, and finiteness of the ESN.

For cycle detection, a cycle occurs when a formula cell depends on its own value, usually indirectly. Cycles are easily detected during the depth-first search recursion. Assuming a cell is observed when it is edited, a topological edit causing a cycle will be detected immediately in both JIT and conventional automatic recalculation.

For impure functions, functional programs such as spreadsheets assume that all functions are pure functions; i.e., they have no side effects and always produce the same result for a given set of inputs. Real spreadsheets include impure functions such as DATE( ) and RAND( ) which produce different results at different times. These are easily handled in both JIT and conventional recalculation as special cases. Always including cells containing impure functions in the ROI will produce results equivalent to conventional automatic recalculation; however, in practice this may not be the desirable since it is generally inefficient and unnecessary.

For finiteness of the ESN, the ESN should be able to increment to infinity as the spreadsheet is edited and recalculated. This is of course not possible, but a 64-bit ESN would support 1,000,000 edits per second for 584,524 years before overflowing so is of no practical concern. Even so, overflow of the ESN is easily handled by observing all cells in the spreadsheet (thus completing a full recalculation) and resetting the ESN to zero.

Figure 8:
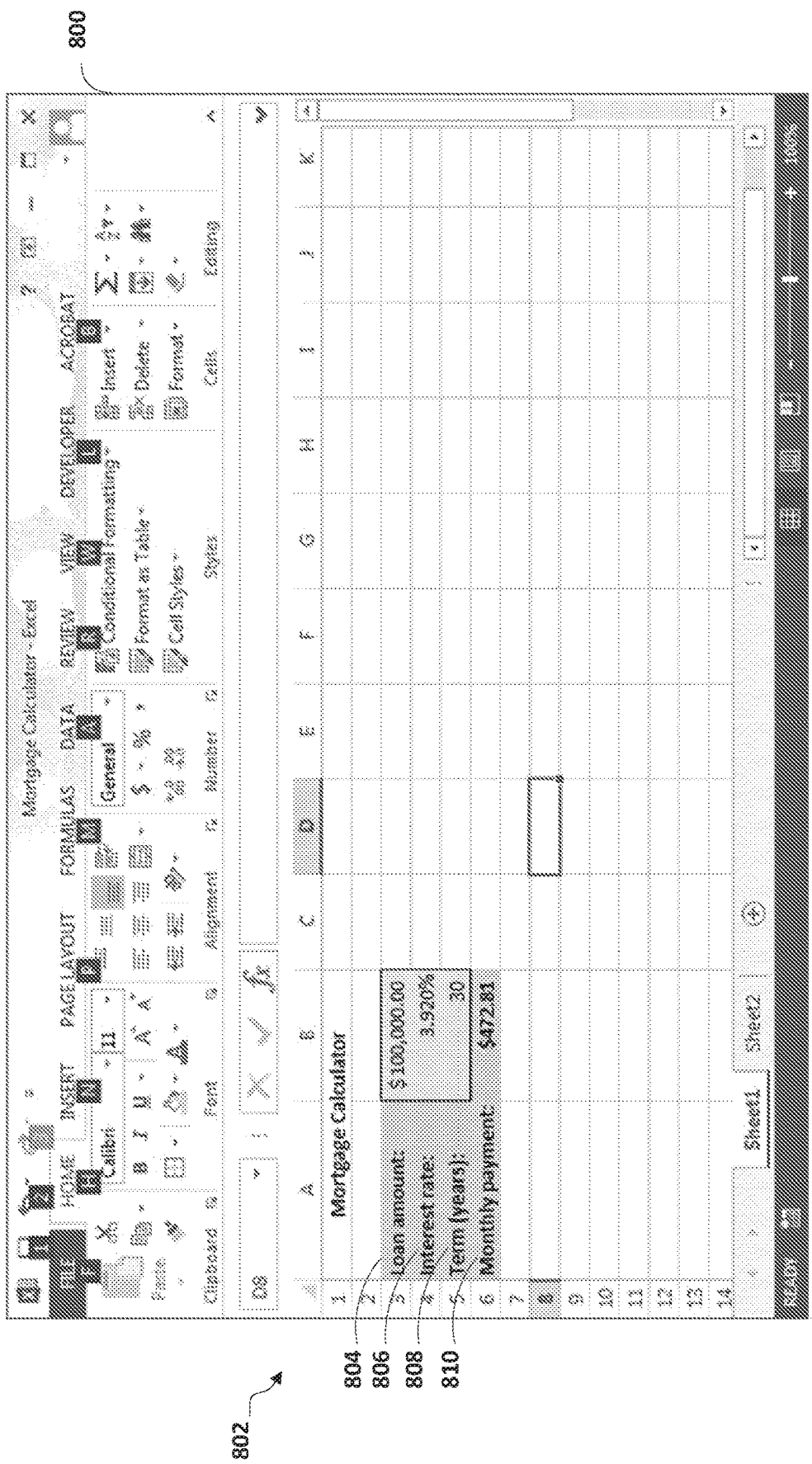
FIG. 8 is a diagram that illustrates an exemplary first worksheet with a mortgage calculator including input parameters and a calculated monthly payment.
Figure 9:
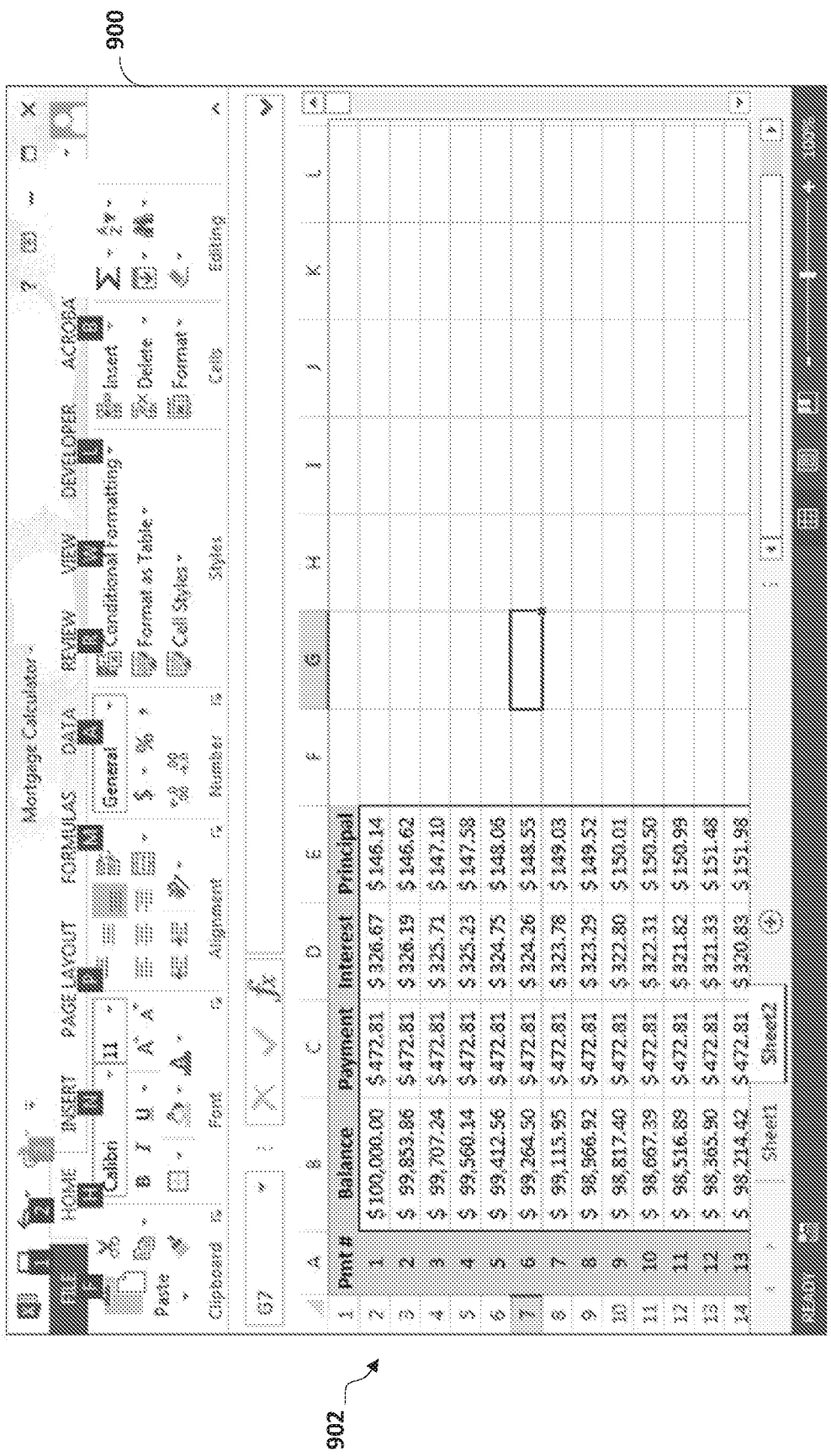
FIG. 9 is a diagram that illustrates an exemplary second worksheet with an amortization table.

To understand the potential benefits of the just-in-time recalculation algorithms 600 and 700 in a realistic use case, consider a mortgage calculator 802 illustrated in FIGS. 8 and 9 with respect to FIG. 5 as described above.

FIG. 8 is a diagram that illustrates an exemplary first worksheet 800 with the mortgage calculator 802 including input parameters 804-808 and a calculated monthly payment 810. The first worksheet 800 corresponds to worksheet 502 as described above in FIG. 5.

In the example of FIG. 8, a user will fill in the three input parameters 804-808 on worksheet 502 and observe the monthly payment 810 to test "what if" scenarios. For example, by entering different values in the "term" input parameter 808 and the "interest rate" input parameter 806, the user may see the effect on the calculated monthly payment 810. After such experimentation, the user may view worksheet 900 (FIG. 9) to observe the detailed amortization schedule.

FIG. 9 is a diagram that illustrates an exemplary second worksheet 900 with an amortization table 902. The second worksheet 900 corresponds to worksheet 504 as described above in FIG. 5.

FIG. 10 is a table 1000 that illustrates an example of total cell formula calculations with a just-in-time recalculation algorithm. In the example of FIG. 10, a loan amount is entered in cell 804 of the first worksheet 800 (Edit #1). An interest amount is entered in cell 806 of the first worksheet 800 (Edit #2). A loan term is entered in cell 808 of the first worksheet 800 (Edit #3). The interest amount is changed in cell 806 of the first worksheet 800 (Edit #4). The loan amount is changed in cell 808 of the first worksheet 800 (Edit #5). Lastly, the amortization table 902 is viewed in the second worksheet 900, and the just-in-time recalculation algorithm (for example, the just-in-time recalculation algorithm 600 or the just-in-time recalculation algorithm 700 as described above) recalculates the second worksheet 900 based on the first worksheet 800 when the second worksheet 900 is viewed (Edit #6). As illustrated in FIG. 10, the five edits to the first worksheet 800 and the edit to the second worksheet 900 (i.e., viewing of the second worksheet 900) results in five cell formula evaluations in the first worksheet 800 and 1,440 cell formula evaluations in the second worksheet 900. The total number of cell formula evaluations across the first worksheet 800 and the second worksheet 900 is 1,445 cell formula evaluations.

FIG. 11 is a table 1100 that illustrates a comparative example of total cell formula calculations with conventional automatic recalculation. With conventional automatic recalculation, all formula cells will be evaluated each time an input parameter is changed.

In the example of FIG. 11, a loan amount is entered in cell 804 of the first worksheet 800 (Edit #1). An interest amount is entered in cell 806 of the first worksheet 800 (Edit #2). A loan term is entered in cell 808 of the first worksheet 800 (Edit #3). The interest amount is changed in cell 806 of the first worksheet 800 (Edit #4). The loan amount is changed in cell 808 of the first worksheet 800 (Edit #5). Lastly, the amortization table 902 is viewed in the second worksheet 900 (Edit #6). As illustrated in FIG. 11, each of the five edits to the first worksheet 800 results in a single cell formula evaluation in the first worksheet 800 and 1,440 cell formula evaluations in the second worksheet 900. The viewing of the second worksheet 900 does not result in any cell evaluations since the cells of the second worksheet 900 were already evaluated in response to Edit #5. The total number of cell formula evaluations across the first worksheet 800 and the second worksheet 900 is 7,205 cell formula evaluations.

With the just-in-time recalculation algorithm, only the cells in the region of interest (for example, the visible window 512 of FIG. 5) will be recalculated. By not recalculating until the second worksheet 900 is viewed, the just-in-time algorithm reduces the number of superfluous calculations by 5,760 cell formula evaluations. In a comparison of FIGS. 10 and 11, the just-in-time algorithm represents an 80% computational savings over conventional automatic recalculation. As explained above, the computational savings of the just-in-time algorithm are especially significant in a server-based environment with a large number of users.

Figure 12:
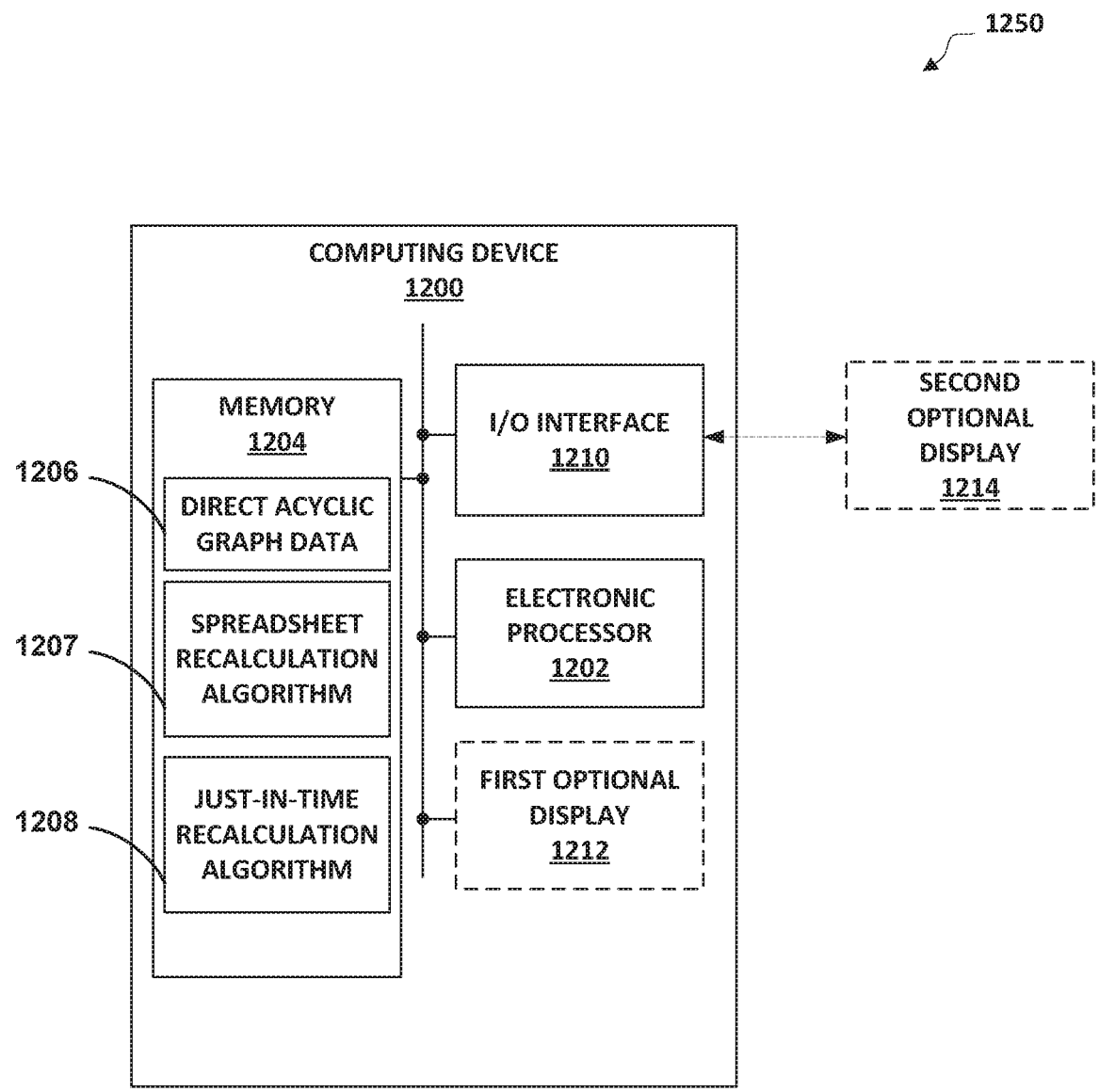
FIG. 12 is a block diagram of a computing device, in accordance with various embodiments of the present disclosure.

FIG. 12 is a block diagram of a computing device 1200, in accordance with various embodiments of the present disclosure. In some examples, the computing device 1200 is a server that provides a virtual environment to a large number of users (for example, hundreds or thousands of users). In other examples, the computing device 1200 is a personal computer, a mobile smartphone, a tablet, or other suitable computing device. It should be understood that, in some embodiments, there may be more than one computing device in configurations different from that illustrated in FIG. 12.

In the example of FIG. 12, the computing device 1200 includes an electronic processor 1202 (for example, a microprocessor or another suitable processing device), a memory 1204 (for example, a non-transitory computer-readable storage medium), an input/output (I/O) interface 1210, a first optional display 1212, and a second optional display 1214. It should be understood that, in some embodiments, the computing device 1200 may include fewer or additional components in configurations different from that illustrated in FIG. 12. Also the computing device 1200 may perform additional functionality than the functionality described herein. In addition, the functionality of the computing device 1200 may be incorporated into other computing devices or other servers. As illustrated in FIG. 12, the electronic processor 1202, the memory 1204, the I/O interface 1210, and the first optional display 1212 are electrically coupled by one or more control or data buses enabling communication between the components of the computing device 1200.

The memory 1204 may include a program storage area (for example, read only memory (ROM)) and a data storage area (for example, random access memory (RAM), and other non-transitory, computer-readable medium). In some examples, the program storage area may store a direct acyclic graph data 1206 and computer-readable instructions regarding a spreadsheet recalculation algorithm (for example, the spreadsheet recalculation algorithm 400 of FIG. 4), a just-in-time recalculation algorithm 1208 (for example, one or both of the just-in-time recalculation algorithms 600 and 700 of FIGS. 6 and 7, respectively), or a combination thereof.

The electronic processor 1202 executes the computer-readable instructions stored in the memory 1204. For example, the electronic processor 1202 may execute the computer-readable instructions stored in the memory 1204 to perform the spreadsheet recalculation algorithm 1207 on the direct acyclic graph data 1206 as described in greater detail in FIG. 13.

The I/O interface 1210 receives data from and provides data to devices external to the computing device 1200. For example, the I/O interface 1210 receives data from and provides data to the second optional display 1214 when the computing device 1200 is part of a larger system 1250 that includes the second optional display 1214. Additionally, for example, the I/O interface 1210 receives data from and provides data to a printer (not shown) when the computing device 1200 is part of a larger system 1250 that includes the printer. In some examples, the I/O interface 1210 may include a port or connection for receiving a wired connection (for example, an Ethernet cable, fiber optic cable, a telephone cable, or the like), a wireless transceiver, or a combination thereof.

Figure 13:
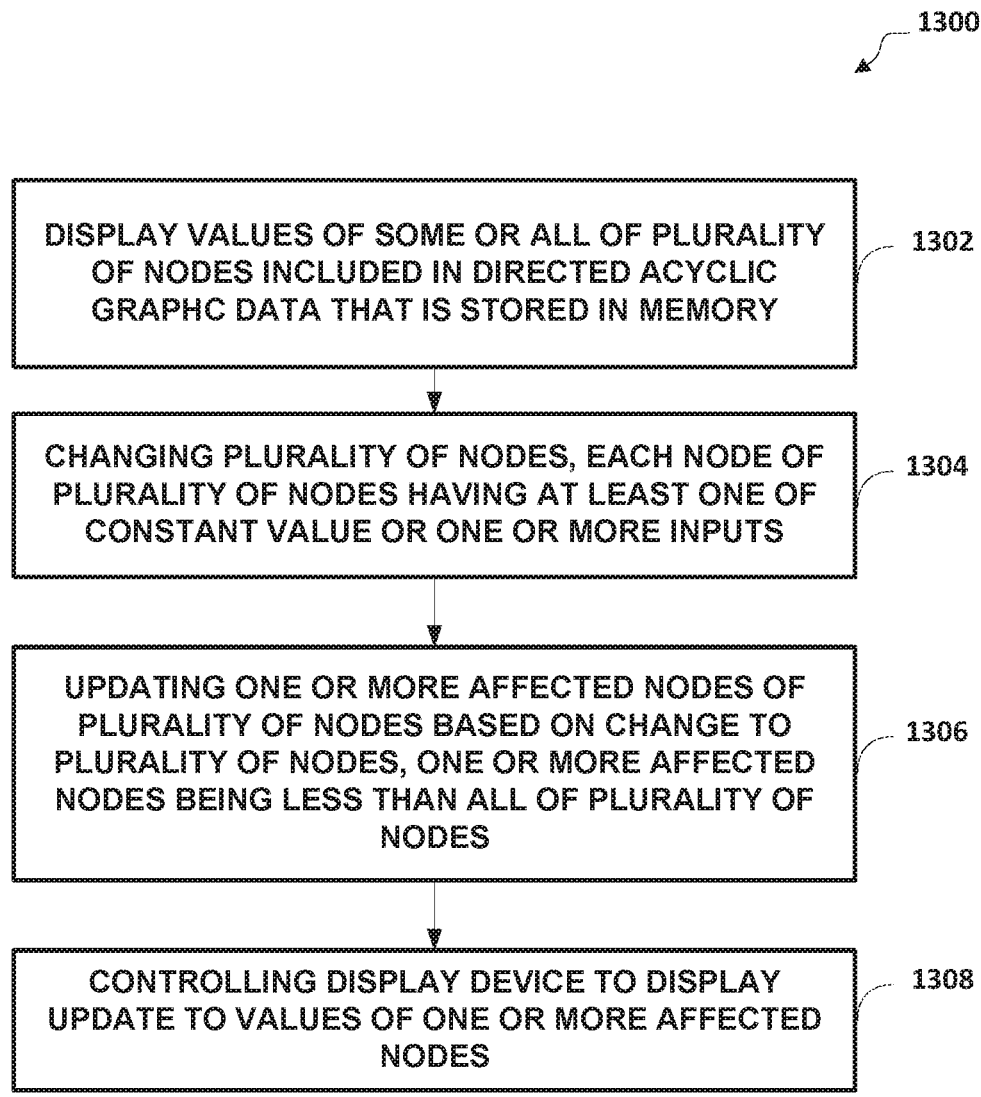
FIG. 13 is a flowchart of a method that implements the spreadsheet recalculation algorithm of FIG. 4.

FIG. 13 is a flowchart of a method 1300 that implements the spreadsheet recalculation algorithm 400 of FIG. 4. While the method 1300 is described with respect to the implementation of the spreadsheet recalculation algorithm 400, the method 1300 is also applicable to the implementation of the just-in-time recalculation algorithms 600 and 700 of FIGS. 6 and 7, respectively.

In the example of FIG. 13, the method 1300 includes displaying, with a display device, values of some or all of a plurality of nodes included in Directed Acyclic Graph (DAG) data that is stored in a memory (at block 1302). The method 1300 also includes changing, with an electronic processor, the plurality of nodes, each node of the plurality of nodes having at least one of a constant value or one or more inputs (at block 1304).

To implement the spreadsheet recalculation algorithm 400, the method 1300 includes updating, with the electronic processor, one or more affected nodes of the plurality of nodes based on the change to the plurality of nodes, the one or more affected nodes being less than all of the plurality of nodes (at block 1306). In some examples, changing the plurality of nodes includes one of adding a node to the plurality of nodes or removing a node from the plurality of nodes. In other examples, changing the plurality of nodes includes changing a characteristic of a node of the plurality of nodes, the characteristic being one selected from a group consisting of an instruction, a source of one or more inputs, or a destination for an output.

The method 1300 also includes controlling, with the electronic processor, the display device to display the update to values of the one or more affected nodes (at block 1308).

Accordingly, the present disclosure provides a new and useful spreadsheet recalculation algorithm that behaves similar to conventional automatic recalculation from the perspective of a user, but with increased efficiency due to the reduction of some or all superfluous calculations. Various features and advantages of the present disclosure are set forth in the following claims.

What is claimed is:

1. A computing device comprising:
    an electronic processor; and
    a memory coupled to the electronic processor, the memory including
        Directed Acyclic Graph (DAG) data having a plurality of nodes, each node of the plurality of nodes having at least one of a constant value or one or more inputs that are inputs from one or more nodes of the plurality of nodes, and
        program instructions that, when executed by the electronic processor, cause the electronic processor to
            receive an input to change the plurality of nodes from a user of the computing device,
            change the plurality of nodes based on the input that is received, and
            update one or more affected nodes of the plurality of nodes based on the change to the plurality of nodes, the one or more affected nodes being less than all of the plurality of nodes,
        wherein a first node of the plurality of nodes has the constant value, and
        wherein a second node of the plurality of nodes has the one or more inputs,
        wherein the program instructions further include a global counter (ESN), and wherein the program instructions that, when executed by the electronic processor, further cause the electronic processor to increment a value of the ESN each time the plurality of nodes is changed, and
        wherein the program instructions further include an update timestamp (USN) for each of the plurality of nodes, and wherein the program instructions that, when executed by the electronic processor, further cause the electronic processor to
            detect that a value of the USN of the specific node of the plurality of nodes is less than the value of the ESN,
            detect that nodes that provide an input to the specific node have USN values that are greater than the value of the USN of the specific node,
            perform a recalculation of the output of the specific node of the plurality of nodes in response to detecting that the value of the USN of the specific node is less than the value of the ESN and that the nodes that provide the input to the specific node have USN values that are greater than the value of the USN of the specific node, and
            set the USN to the value of the ESN after the output of the node of the plurality of nodes is recalculated.

2. The computing device of claim 1, wherein the DAG data further includes a plurality of edges, wherein a first node type of the plurality of nodes has one or more edges of the plurality of edges in addition to the at least one of the constant value or the one or more inputs, and wherein a second node type of the plurality of nodes has only the one or more inputs.

3. The computing device of claim 2, wherein each node of the first node type is represented by the one or more edges leading into one or more downstream nodes of the plurality of nodes, and wherein each node of the one or more downstream nodes is either the first node type or the second node type.

4. The computing device of claim 2, wherein each node of the first node type has an output based on the at least one of the constant value or one or more values of the one or more inputs, and wherein the output of the each node of the first node type of the plurality of nodes is an input to one or more downstream nodes in the plurality of nodes.

5. The computing device of claim 1, further comprising a display,
    wherein the program instructions that, when executed by the electronic processor, further cause the electronic processor to
        control the display to display values of some or all of the plurality of nodes, and
        control the display to display the update to values of the one or more affected nodes.

6. The computing device of claim 5, wherein a subset of the plurality of nodes are a region of interest, and wherein the program instructions that, when executed by the electronic processor, further cause the electronic processor to perform a topological sort of the subset of the plurality of nodes when values of the subset of the plurality of nodes are displayed on the display.

7. The computing device of claim 6, wherein the program instructions that, when executed by the electronic processor, further cause the electronic processor to
    add nodes to the subset of the plurality of nodes, and
    incrementally extend the topological sort when the nodes added to the subset of the plurality of nodes are displayed on the display.

8. The computing device of claim 1, wherein, to change the plurality of nodes, the electronic processor is configured to perform one selected from a group consisting of:
    add a node to the plurality of nodes,
    remove a node from the plurality of nodes,
    change an instruction of a node of the plurality of nodes,
    change a source of the one or more inputs to a node of the plurality of nodes, or
    change a destination for an output of a node of the plurality of nodes.

9. The computing device of claim 1, wherein the program instructions further include an observation timestamp (OSN) for each of the plurality of nodes, and wherein the program instructions that, when executed by the electronic processor, further cause the electronic processor to
    detect that an output of a specific node of the plurality of nodes is observed,
    set a value of the OSN to the value of the ESN after detecting the output of the specific node is observed.

10. The computing device of claim 1, wherein the constant value is a numerical value.

11. A system comprising:
    a display device; and
    a server communicatively connected to the display device, the server including
        an electronic processor; and
        a memory coupled to the electronic processor, the memory including Directed Acyclic Graph (DAG) data having a plurality of nodes, each node of the plurality of nodes having at least one of a constant value or one or more inputs that are inputs from one or more nodes of the plurality of nodes, and program instructions that, when executed by the electronic processor, cause the electronic processor to control the display device to display values of some or all of the plurality of nodes, receive an input to change the plurality of nodes from a user of the display device, change the plurality of nodes based on the input that is received, update one or more affected nodes of the plurality of nodes based on the change to the plurality of nodes, the one or more affected nodes being less than all of the plurality of nodes, and control the display device to display the update to values of the one or more affected nodes, wherein a first node of the plurality of nodes has the constant value, and wherein a second node of the plurality of nodes has the one or more inputs, wherein the program instructions further include a global counter (ESN), and wherein the program instructions that, when executed by the electronic processor, further cause the electronic processor to increment the ESN each time the plurality of nodes is changed, and wherein the program instructions further include an update timestamp (USN) for each of the plurality of nodes, and wherein the program instructions that, when executed by the electronic processor, further cause the electronic processor to detect that a value of the USN of the specific node of the plurality of nodes is less than the value of the ESN, detect that nodes that provide an input to the specific node have USN values that are greater than the value of the USN of the specific node, perform a recalculation of the output of the specific node of the plurality of nodes in response to detecting that the value of the USN of the specific node is less than the value of the ESN and that the nodes that provide the input to the specific node have USN values that are greater than the value of the USN of the specific node, and set the USN to the value of the ESN after the output of the node of the plurality of nodes is recalculated.

12. The system of claim 11, further comprising a printer, wherein the program instructions that, when executed by the electronic processor, further cause the electronic processor to control the printer to print values of the plurality of nodes.

13. The system of claim 11, wherein, to change the plurality of nodes, the electronic processor is configured to perform one selected from a group consisting of:
add a node to the plurality of nodes,
remove a node from the plurality of nodes,
change an instruction of a node of the plurality of nodes,
change a source of the one or more inputs to a node of the plurality of nodes, or
change a destination for an output a node of the plurality of nodes.

14. The system of claim 11, wherein the program instructions further include an observation timestamp (OSN) for each of the plurality of nodes, and wherein the program instructions that, when executed by the electronic processor, further cause the electronic processor to detect that an output of a specific node of the plurality of nodes is observed, set a value of the OSN to the value of the ESN after detecting the output of the specific node is observed.

15. A method for performing a spreadsheet recalculation algorithm, the method comprising:

displaying, with a display device, values of some or all of a plurality of nodes included in Directed Acyclic Graph (DAG) data that is stored in a memory;

receiving, with an electronic processor, an input to change the plurality of nodes from a user of the display device;

changing, with the electronic processor, the plurality of nodes based on the input that is received, each node of the plurality of nodes having at least one of a constant value or one or more inputs that are inputs from one or more nodes of the plurality of nodes;

updating, with the electronic processor, one or more affected nodes of the plurality of nodes based on the change to the plurality of nodes, the one or more affected nodes being less than all of the plurality of nodes;

controlling, with the electronic processor, the display device to display the update to values of the one or more affected nodes;

incrementing a global counter (ESN) each time the plurality of nodes is change;

updating a timestamp (USN) for each of the plurality of nodes;

detecting that a value of the USN of a specific node of the plurality of nodes is less than the value of the ESN;

detecting that nodes that provide an input to the specific node have USN values that are greater than the value of the USN of the specific node;

performing a recalculation of the output of the specific node of the plurality of nodes in response to detecting that the value of the USN of the specific node is less than the value of the ESN and that the nodes that provide the input to the specific node have USN values that are greater than the value of the USN of the specific node; and setting the USN to the value of the ESN after the output of the node of the plurality of nodes is recalculated, wherein a first node of the plurality of nodes has the constant value, and wherein a second node of the plurality of nodes has the one or more inputs.

16. The method of claim 15, wherein changing the plurality of nodes further includes one of adding a node to the plurality of nodes or removing a node from the plurality of nodes.

17. The method of claim 15, wherein changing the plurality of nodes further includes changing a characteristic of a node of the plurality of nodes, the characteristic being one selected from a group consisting of:
an instruction,
a source of one or more inputs, or
a destination for an output.

18. A non-transitory computer-readable medium comprising instructions that, when executed by an electronic processor, cause the electronic processor to perform a set of operations, the set of operations comprising:

controlling a display device to display values of some or all of a plurality of nodes included in Directed Acyclic Graph (DAG) data that is stored in a memory;
receiving an input to change the plurality of nodes from a user of the display device;
changing the plurality of nodes based on the input that is received, each node of the plurality of nodes having at least one of a constant value or one or more inputs that are inputs from one or more nodes of the plurality of nodes;
updating one or more affected nodes of the plurality of nodes based on the change to the plurality of nodes, the one or more affected nodes being less than all of the plurality of nodes;
controlling the display device to display the update to values of the one or more affected nodes;
incrementing a global counter (ESN) each time the plurality of nodes is changed;
updating a timestamp (USN) for each of the plurality of nodes;
detecting that a value of the USN of a specific node of the plurality of nodes is less than the value of the ESN;
detecting that nodes that provide an input to the specific node have USN values that are greater than the value of the USN of the specific node;
performing a recalculation of the output of the specific node of the plurality of nodes in response to detecting that the value of the USN of the specific node is less than the value of the ESN and that the nodes that provide the input to the specific node have USN values that are greater than the value of the USN of the specific node; and
setting the USN to the value of the ESN after the output of the node of the plurality of nodes is recalculated,
wherein a first node of the plurality of nodes has the constant value, and
wherein a second node of the plurality of nodes has the one or more inputs.

* * * * *